United States Patent
Tolly et al.

(10) Patent No.: US 9,840,183 B2
(45) Date of Patent: Dec. 12, 2017

(54) MECHANICALLY ACTUATED CARGO RESTRAINT SYSTEM

(71) Applicant: WOLF TECHNICAL SERVICES, INC., Indianapolis, IN (US)

(72) Inventors: Aaron James Tolly, Fishers, IN (US); Amy Lynn Harris, Fishers, IN (US)

(73) Assignee: Wolf Technical Services, Inc., Indianapolis, IN (US)

( * ) Notice: Subject to any disclaimer, the term of this patent is extended or adjusted under 35 U.S.C. 154(b) by 0 days.

(21) Appl. No.: 15/026,881

(22) PCT Filed: Oct. 8, 2014

(86) PCT No.: PCT/US2014/059741
§ 371 (c)(1),
(2) Date: Apr. 1, 2016

(87) PCT Pub. No.: WO2015/054415
PCT Pub. Date: Apr. 16, 2015

(65) Prior Publication Data
US 2016/0250961 A1    Sep. 1, 2016

Related U.S. Application Data

(60) Provisional application No. 61/888,442, filed on Oct. 8, 2013.

(51) Int. Cl.
*B60P 7/08* (2006.01)
*B64D 25/06* (2006.01)
*B64D 9/00* (2006.01)

(52) U.S. Cl.
CPC .......... *B60P 7/0846* (2013.01); *B60P 7/0853* (2013.01); *B64D 9/003* (2013.01); *B64D 25/06* (2013.01); *Y02T 50/46* (2013.01)

(58) Field of Classification Search
CPC ...... B60P 7/0846; B60P 7/0853; B64D 9/003; B64D 25/06; Y02T 50/46
(Continued)

(56) References Cited

U.S. PATENT DOCUMENTS

3,341,250 A    9/1967    Rasmussen
4,083,511 A    4/1978    Ikesue
(Continued)

*Primary Examiner* — Stephen Gordon
(74) *Attorney, Agent, or Firm* — Maginot, Moore & Beck LLP (57) ABSTRACT

A mechanically actuated cargo restraint system for a vehicle includes a rotatable reel in a frame, first and second flexible tethers, and a mechanical device. The first flexible tether has a first end coupled to the rotatable reel and a second end capable of being coupled to a cargo item, the first flexible tether is windable around the rotatable reel. The mechanical device includes a pawl and cog that are movable with respect to each other, the pawl coupled to the rotatable reel for rotatable movement therewith. Movement of a cargo item attached to the first flexible tether that causes the first flexible tether to move in an unwinding direction on the rotatable reel causes movement of the pawl-containing member relative to the cog. Velocity in the unwinding direction such as that encountered during a crash or free-fall engages the pawl into the cog, thereby inhibiting movement of the first flexible tether in an unwinding direction on the rotatable reel.

20 Claims, 7 Drawing Sheets

(58) Field of Classification Search
USPC ............ 410/96, 97, 100, 103, 12; 24/68 CD;
254/217, 218, 223
See application file for complete search history.

(56) References Cited

U.S. PATENT DOCUMENTS

| | | | |
|---|---|---|---|
| 4,417,702 A | 11/1983 | Fohl | |
| 4,432,507 A | 2/1984 | Rietsch et al. | |
| 5,135,182 A | 8/1992 | Park | |
| 5,771,993 A | 6/1998 | Anderson et al. | |
| 8,197,165 B2 * | 6/2012 | Hartmann | B60P 7/08 410/100 |
| 2003/0059269 A1 | 3/2003 | Bosley | |
| 2009/0212159 A1 | 8/2009 | O'Brien et al. | |

* cited by examiner

MECHANICALLY ACTUATED CARGO RESTRAINT SYSTEM

This application claims the benefit of U.S. Provisional Patent Application Ser. No. 61/888,442, filed Oct. 8, 2013.

TECHNICAL FIELD OF THE INVENTION

The present invention relates to a restraint system, and more particularly to a reel-based system for restraining cargo, such as personnel in and on moving vehicles.

BACKGROUND

Personnel in and on moving vehicles can be subjected to high acceleration environments, such as a crash or quick velocity change that give rise to rapid relative motion between the vehicle and the occupant. These environments create a risk of injury due to contact with vehicle or equipment structures, and a risk of inadvertent ejection from the vehicle. The risk of injury is especially pronounced with personnel who cannot be restrained in a typical seat restraint system due to mobility requirements, such as mobile aircrew members within the cargo bays of military helicopters.

Systems currently in use for restraining helicopter mobile aircrew include the gunner's belt with fixed-length tether, or a vehicle-mounted tether and reel system. The drawbacks to the gunner's belt with a fixed-length tether are that the user is free to flail at any point within the sphere of reach of the tether; some tethers are not adjustable in length; and some tethers must be continually adjusted manually by the user, interrupting critical mission duties.

Fixed-length tether systems allow unwanted free travel of the user at high velocities relative to the vehicle, unwanted contact with the vehicle structures at high velocity, and possible inadvertent ejection or partial ejection from the vehicle due to unwanted free travel. This gives rise to contact injuries, acceleration injuries and compression injuries, as well as the dangers associated with travel outside the vehicle envelope.

The vehicle-mounted tether and reel system addresses some of the drawbacks of the fixed-length tether system by using a retractable reel that takes up slack in the tether between the user and the reel. A reel locking mechanism, which is based on sensed acceleration, can lock the reel to prevent the user or crew member from further travel in the event of high acceleration event. A drawback to the vehicle-mounted tether and reel system is that the reel locking mechanism is based on acceleration of the tether unwinding from the reel, which leads to inadvertent locking of the reel during high vibration dynamics or in turbulent wind conditions, when there is very little relative motion between the user and the vehicle. They also require attachment to the vehicle at a point capable of supporting a 5000-pound load. There are few vehicles that can meet this requirement without major structural changes. The structural changes are cost prohibitive and prevent the installation of the potentially life saving technology. The vehicle-mounted systems are not compatible with attachment at existing D-ring locations that crewmembers currently use for attaching fixed-length tethers.

SUMMARY OF THE INVENTION

In accordance with the present invention, a mechanically actuated cargo restraint system for a vehicle includes a rotatable reel in a frame, first and second flexible tethers, and a mechanical braking device. The first flexible tether has a first end coupled to the rotatable reel and a second end capable of being coupled to one of a vehicle and a cargo item. In some embodiments, the second flexible tether, which is fixed-length, is coupled to the other of the vehicle or cargo item. The first flexible tether is windable around the rotatable reel. The mechanical braking device includes a pawl and cog that are movable with respect to each other. The pawl is coupled to the rotatable reel for rotatable movement therewith. Movement of the first flexible tether in an unwinding direction on the rotatable reel causes movement of the pawl member relative to the cog. The pawl is configured to engage the cog responsive to rotation of the rotatable reel at a velocity in the unwinding direction exceeding a first threshold corresponding to a crash or free-fall, thereby inhibiting movement of the first flexible tether in an unwinding direction on the rotatable reel.

In some embodiments, the cargo item comprises a human being and the vehicle comprises an aircraft such as a helicopter or airplane.

In some embodiments, the second flexible tether is fixed in length and has a first end that is attached to the reel by a support rod. The second end is attached to a locking hook that can attach to a D-ring. Preferably, the D-ring is fixed to the cabin of the aircraft in a convenient location, as is conventional.

Thus, in some embodiments, the mechanically-actuated system for safely restraining mobile personnel in and on moving vehicles as also has a manual release for the braking device. The system consists of a length of first flexible tether spooled onto a rotatable reel which is connected through a central shaft to a pawl. The pawl stops the rotation of the webbing reel when the rotational velocity of the webbing reel engages the ratchet switch. The pawl engages to and disengages from the cog, by means of a mechanically-actuated ratchet switch that can be disengaged by the depressing the ratchet lock plunger.

In some embodiments, the pawl device engages the cog (which is affixed to the non-rotating frame) to stop rotation of the reel shaft during the rapid extraction of the webbing from the reel, after the rotational velocity of the reel shaft during extraction exceeds a pre-determined value. The pawl disengages the reel shaft from the frame when the user depresses a reset button, thereby depressing the ratchet lock plunger. Until the user depresses the reset button to disengage the pawl, a ratchet assembly prevents rotation of the central shaft in the unwinding direction, preventing further extraction of the flexible tether from the reel. Nevertheless, the ratchet assembly in this embodiment allows rotation of the central shaft in the winding direction, allowing a retraction device to wind the slack in the flexible tether back onto the reel if the user moves closer to the attachment point. In the case of the user moving closer to the attachment point, the ratchet mechanism causes engagement of the pawl with each successive cog tooth, thereby shortening the amount of extracted webbing.

To this end, in at least some embodiments, the frame further includes a return mechanism housing and a return mechanism therein. The return mechanism is operably coupled to provide a biasing force on the rotatable reel in a winding direction to retract the slack of the first flexible tether onto the reel. The amount of total tether required to be retracted is dependent on the desired travel radius of the attached user or cargo item.

Embodiments of the present invention manage the kinetic energy of the user during vehicle acceleration events by stopping the webbing reel during webbing extraction whenever the angular velocity of the webbing reel exceeds a pre-determined design value.

The advantages of at least some embodiments of the present invention are that it allows movement within the cabin by allowing the webbing to be extended and retracted without any intervention by the user; it can be released after an event allowing the user to continue movement without unhooking the device; using the hook on the device allows it to be moved from place to place within the airframe cabin and hooked to any restraint D-ring. The present invention can be attached and used at any D-ring in the vehicle that is currently used by crewmembers to attach a fixed-length tether. However, it will be appreciated that embodiments with fewer than all of the features will still obtain many of the benefits described herein.

In the exemplary embodiment, the device operates autonomously, requires no input power, and requires no user intervention, except to unlock it after a locking event. The use of the mechanically-actuated cog and pawl device enables braking of the reel shaft during the initial acceleration of a velocity change event, such as a crash which causes a high acceleration (g-force) over a short period of time. This high acceleration causes the cog and pawl device to lock and prevent further unwinding of the flexible tether.

Some embodiments employ a power spring having the general structure of a clock spring as the return mechanism. The power spring is designed so that, throughout its action, it delivers a lesser range of torque than a typical coil spring. The lesser range of torque enables the power required to resist webbing extraction and for effecting tether retraction, without the applied torque being so great as to fatigue the user.

The above-described features and advantages, as well as others, will become more readily apparent to those of ordinary skill in the art by reference to the following detailed description and accompanying drawings.

DESCRIPTION OF THE PREFERRED EMBODIMENTS

Figure 1:
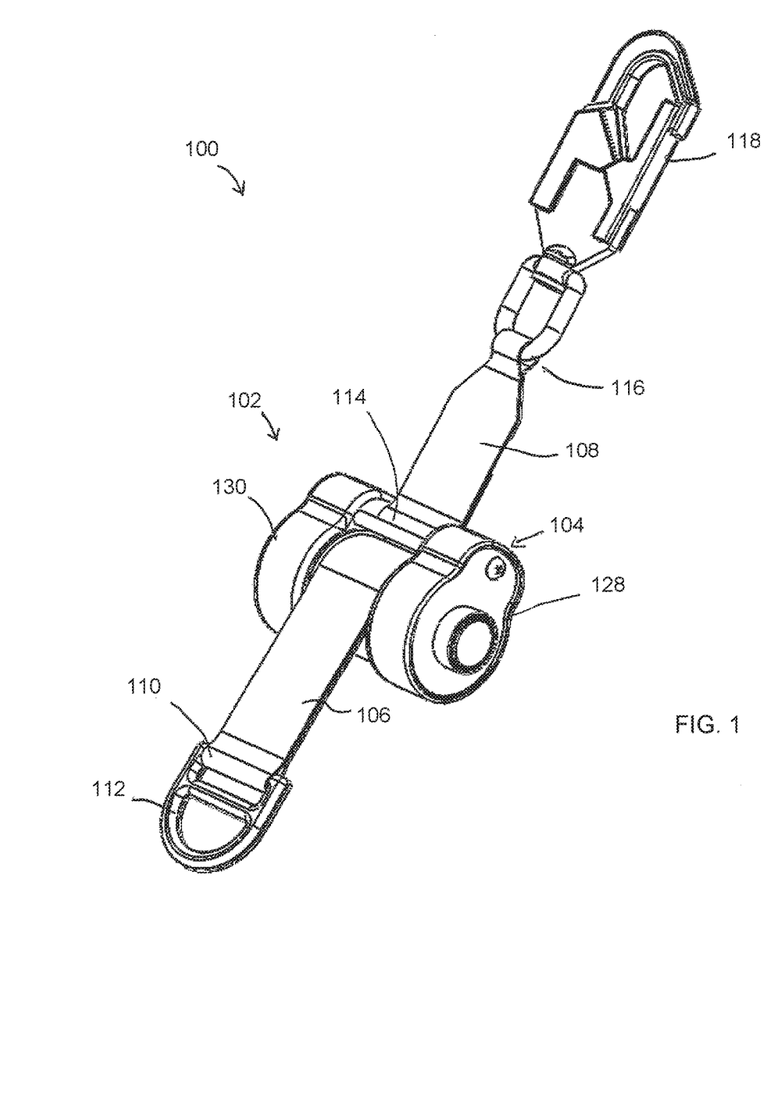
FIG. 1 shows a perspective view of a restraint system according to a first embodiment of the invention.

FIG. 1 shows a perspective view of an exemplary embodiment of a mechanically actuated cargo restraint system 100 for a vehicle, not shown. The vehicle may suitably be an aircraft. The restraint system 100 includes a reel assembly 102 having a frame 104, a first flexible tether 106, and a second flexible tether 108. The first flexible tether 106 is preferably constructed of seat-belt type webbing, and is windable around the rotatable reel assembly 102. The first flexible tether 106 is movable in both a winding direction and an unwinding direction with respect to the frame 104. To this end, the first flexible tether 106 has a first end (not shown in FIG. 1) coupled to the rotatable reel assembly 102.

The first flexible tether 106 also contains a second end 110 coupled to a rigid anchoring device 112 capable of being coupled to a cargo item. In this embodiment, the cargo item is an aircrew member having a safety attachment with a coupling mechanism, not shown, but which may take many forms and is known in the art. The rigid anchoring device 112 in this embodiment is configured to connect to the aircrew member's coupling mechanism. To this end, the rigid anchoring device 112 may suitably be a D-ring formed of strong, rigid material such as metal. Suitable hooks attached to ends of webbing are known.

The second flexible tether 108 has a first end 114 coupled to a portion of the frame 104 and a second end 116 coupled to a locking hook 118. The locking hook 118 is configured to be coupled to a D-ring in the cargo cabin of the vehicle, not shown. The second flexible tether 108 is preferably a seat belt-like webbing material tether. The second flexible tether 108 is not intended to wind about the reel assembly 102, and is of a fixed length. In use, the second flexible tether 108 connects to a stationary structure of the vehicle, and the first flexible tether 106 connects to a movable cargo item, such as a person. It is intended that the second flexible tether 108 in most cases does not have the length to rest on the ground, and is at a fixed, extended length during almost all use and non-use. It will be appreciated that it is possible in other embodiments to provide the first (winding) flexible tether 106 with a locking hook 118 to couple to the vehicle, and provide the second (fixed-length) flexible tether 108 with a D-ring or other device to which the cargo item may be connected.

Figure 2:
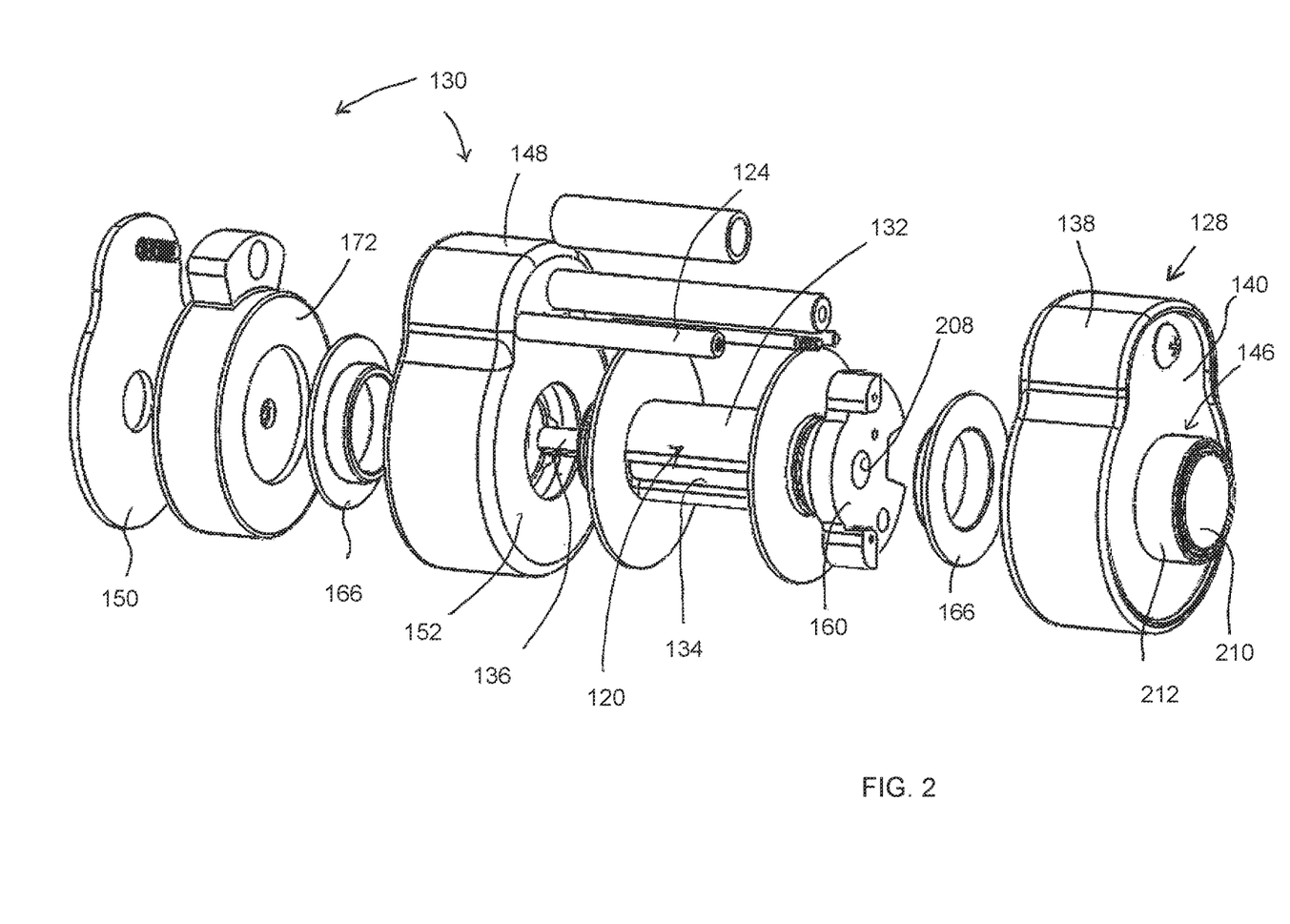
FIG. 2 shows an exploded perspective view of a rotatable reel assembly of the restraint system of FIG. 1.
Figure 3:
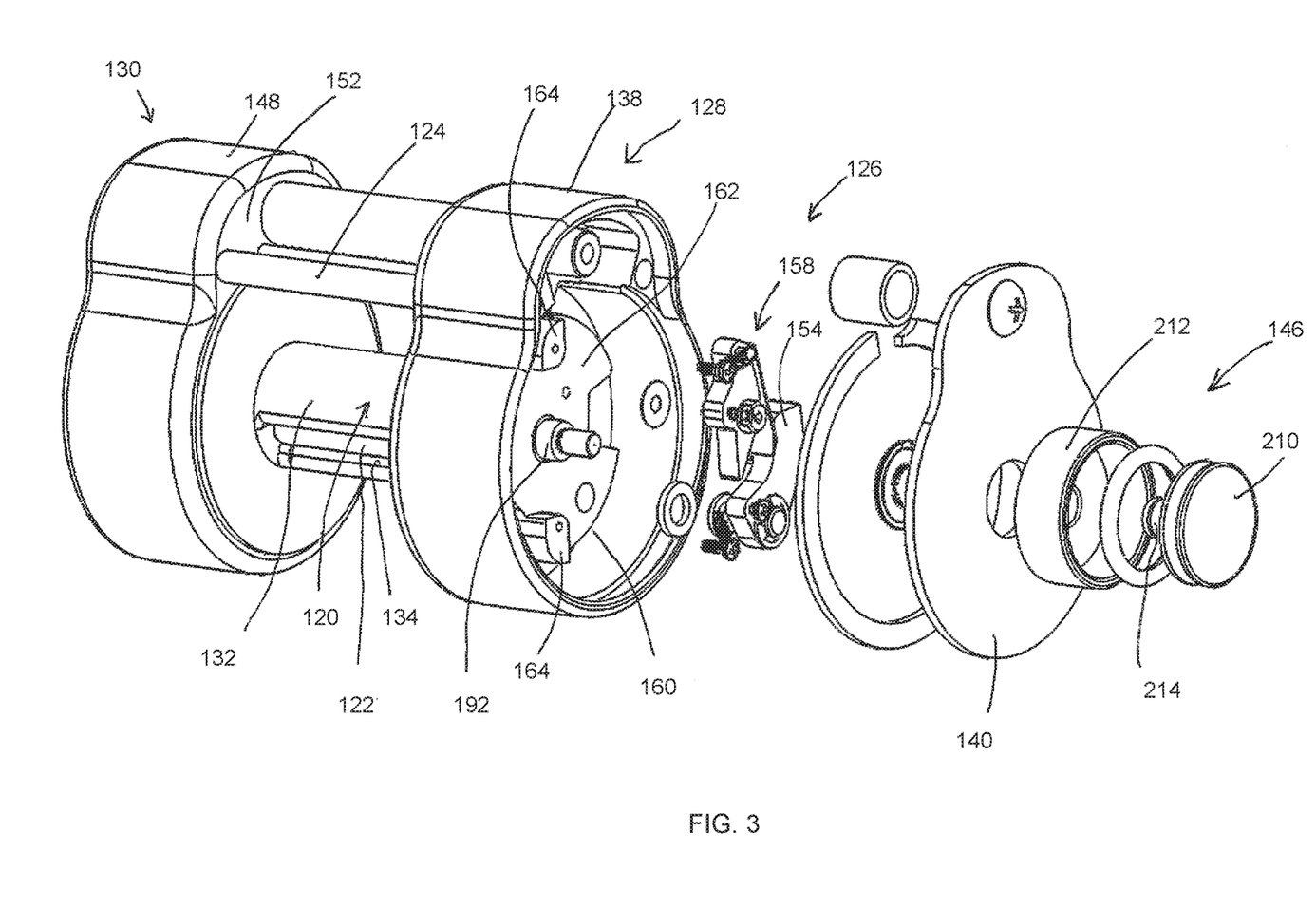
FIG. 3 shows a different exploded perspective view of a rotatable reel assembly of FIG. 2, wherein the contents of the first housing of the reel assembly are shown.

Referring again to the exemplary embodiment of FIG. 1, FIGS. 2-4 show in further detail exploded views of the reel assembly 102. With simultaneous reference to FIGS. 1-4, the reel assembly 102 includes a rotatable shaft 120, support rods 124, a mechanical braking device 126, a first housing 128, a second housing 130, and a return mechanism 168. As shown in FIGS. 2 and 3, the rotatable shaft 120 includes a shaft retaining pin 122, a core 132, and an extension 136. The shaft core 132 includes a surface around which the first flexible tether 106 may be wound. The shaft core 132 is substantially disposed between the first housing 128 and the second housing 130. In this embodiment, the shaft core 132 is a generally cylindrical structure having a diameter of about 2 cm to 4 cm, and has a hollow interior in which the retaining pin 122 is disposed, and includes an axially extending opening 134 and an opposite axially extending opening, not shown in FIG. 2 or 3.

The retaining pin 122 is a rod extending from the first housing 128 to the second housing 130, and forms the structure to which a first end of the first flexible tether 106 may be connected. Preferably, the first end of the first flexible tether 106 is connected to the retaining pin 122 by wrapping around and being sewn onto the overlapping portion of itself. The tether 106 is fed through at least one of the axially extending openings 134 and then wound around the core 132.

The first housing 128, the second housing 130 and the support rods 124 form the frame 104. The first housing 128 encloses the mechanical braking device 126, and the second housing 130 encloses a return mechanism 168. The first housing 128 and the second housing 130 are coupled to the support rods 124, which extend in a parallel axis to the shaft 120 between the housings 128, 130. The support rods 124 provide structural strength to the frame 104.

The first housing 128 comprises a container 138 in the general form of round cup having a bulbous shape, and a cover 140 having a corresponding shape. The container 138 includes a first plate 142 that forms a barrier between the first flexible tether 106 on the rotatable shaft 120 and the interior of the container 138. The cover 140 includes an opening 144 through which a release button assembly 146 is mounted.

Figure 4:
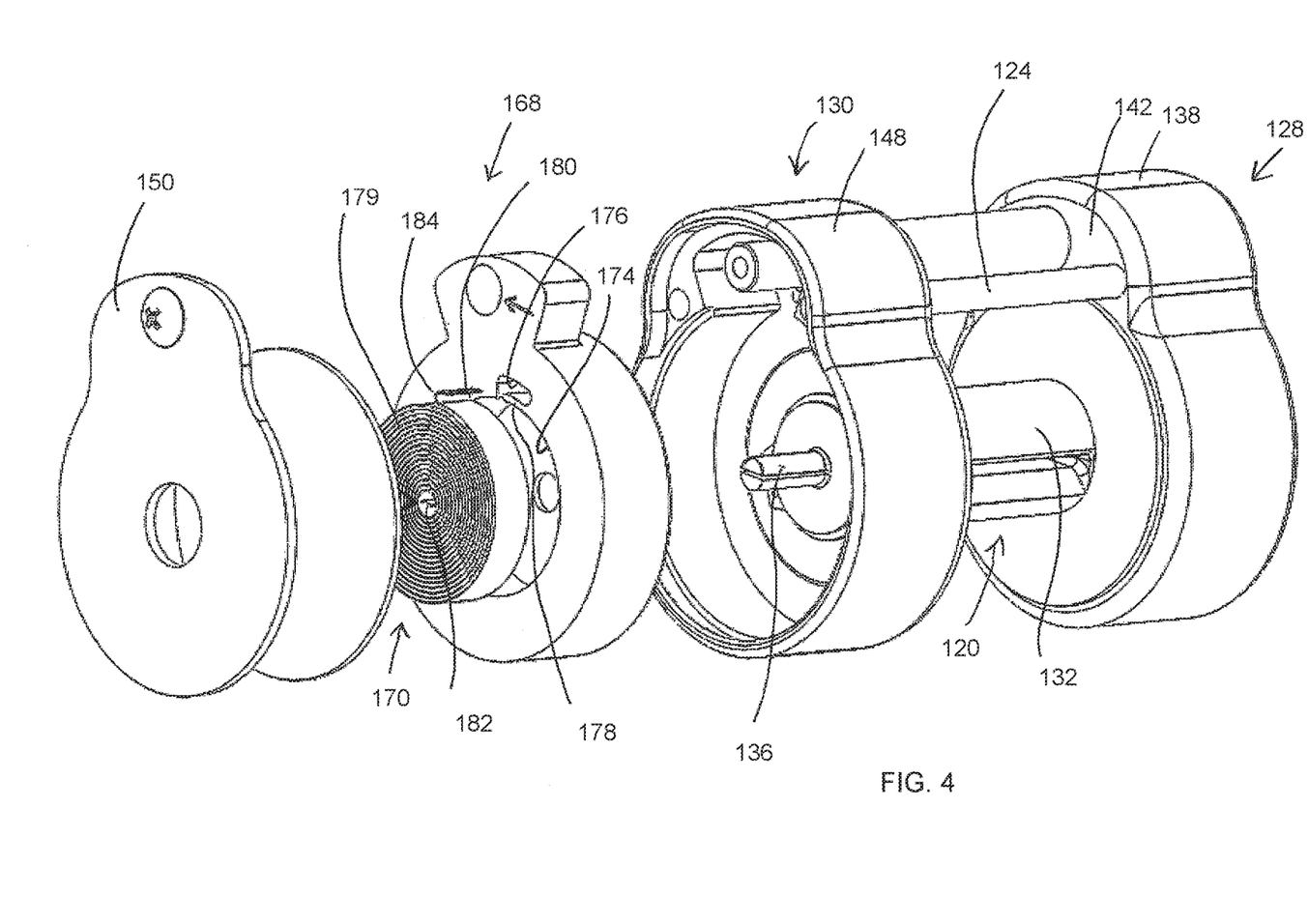
FIG. 4 shows yet a different exploded perspective of the rotatable reel assembly of FIG. 2, wherein the return mechanism of the rotatable reel assembly is shown.

The second housing 130 is similar to the first housing, including a container 148 in the general form of round cup having a bulbous shape, and a cover 150. The container 148 includes a plate 152 that forms a barrier between the first flexible tether 106 on the rotatable shaft 120 and the interior of the container 148.

The mechanical braking device 126 includes a pawl 154, a cog 156, a ratchet lock 158 and a rotating base 160. The rotating base 160 is a formed metallic structure that is rigidly affixed to, and rotates with, the rotating shaft 120. The rotating base 160 may suitably have a disk-like plate 162, and one or more axially extending features 164 extending from the plate 162.

The pawl 154 is coupled to the rotatable shaft reel assembly 102 via the rotating base 160 for rotatable movement therewith. The mechanical braking device 126 is configured to inhibit unwinding of the first flexible tether 106 (unwinding motion of the shaft 120) when the unwinding velocity exceeds a threshold associated with either a crash of the vehicle, or free fall of the cargo item. To this end, movement of the first flexible tether 106 in an unwinding direction on the rotatable shaft 120 causes movement of the rotating base 160 and pawl 154 relative to the cog 156. The pawl 154 is configured to engage the cog 156 responsive to rotation of the rotatable shaft 120 at a velocity in the unwinding direction exceeding a first threshold corresponding to a crash or free-fall. Engagement of the pawl 154 and the cog 156 inhibits movement of the first flexible tether 106 in an unwinding direction on the rotatable shaft 120.

By contrast, ordinary movement (i.e. at a velocity below the first threshold) of a cargo item attached to the first flexible tether 106 that causes unwinding of the first flexible tether 106 is not inhibited under ordinary circumstance. In particular, when the rotatable shaft 120 rotates at velocities below the first threshold, the pawl 154 may move freely relative to the cog 156.

The first flexible tether 106 is spooled onto the rotatable shaft 120 between plates 142 and 152 of the respective housings 128, 130. The rotatable shaft 120 spins freely between the side plates 142 and 152, and is spaced apart from the side plates 142 and 152 by the two (2) shaft support bushings 166.

One end of the rotatable shaft 120 inserts into shaft support bushing 166 in side plate 142 of the first housing 128 adjacent to the pawl 154 and cog 156, and is free to spin within the housing 128. The rotating base 160 is coupled to that end of the rotatable shaft 120. The other end of the rotatable shaft 120 extends into the shaft support bushing 166 in the side plate 152, such that the extension 136 extends into the second housing 130. Within the second housing 130, the extension 136 is coupled to the return assembly 168.

The return mechanism 168 in this embodiment includes a biased element that is employed to constantly supply torque to the rotatable shaft 120 in order to retract slack webbing of the first flexible tether 106 onto the rotatable shaft 120. The return mechanism 168 is configured to continually maintain minimal slack. In this embodiment, the return mechanism 168 comprises a return element 170 and a return element housing 172. The return element 170 in this embodiment is a power spring, which has the general form of a "clock" spring, wherein sheet metal is coiled into flat spiral. The return element housing 172 is fixedly secured to and within the second housing 130. The return element housing 172 includes a first chamber 174, a second chamber 176 and a separating wall 178. The separating wall 178 is disposed between the first chamber 174 and the second chamber 176. The first chamber 174 receives a coiled portion 179 of the spring 170, while the second chamber 176 receives a first end 180 of the spring 170. The second end 182 of the spring 170 is coupled to the extension 136 of the shaft 120. The coiled portion 179 spirals outward from the second end 182, and with no axial displacement between successive coils. Proximate the first end 180, the spring 170 includes a back bend 184 opposite the direction of the spiral. The bend 184 is configured such that the first end 180 extends in a direction opposite the tangential direction of the spiral formed by the coiled portion 179 in the first chamber 174. The bent first end portion 180 is thus trap-fit within the second chamber 176, securing the first end 180 in a non-rotating location. The trap-fit of the first end portion 180 provides the spring tension as the second end 182 is rotated. The use of a trap-fit of the first end 180 eliminates the need for a mechanical coupler, such as a screw, rivet or bolt, which adds weight and can be prone to failures.

Thus, the second end 182 of the power spring 170 is fixed to the rotatable shaft 120 via the extension 136, so that the power spring 170 rotates as the rotatable shaft 120 rotates. Rotation of the power spring 170 compresses the power spring 170, placing it under increased tension, during extraction of the first flexible tether 106. The power spring 170 is least compressed when the first flexible tether 106 is fully retracted.

Figure 5:
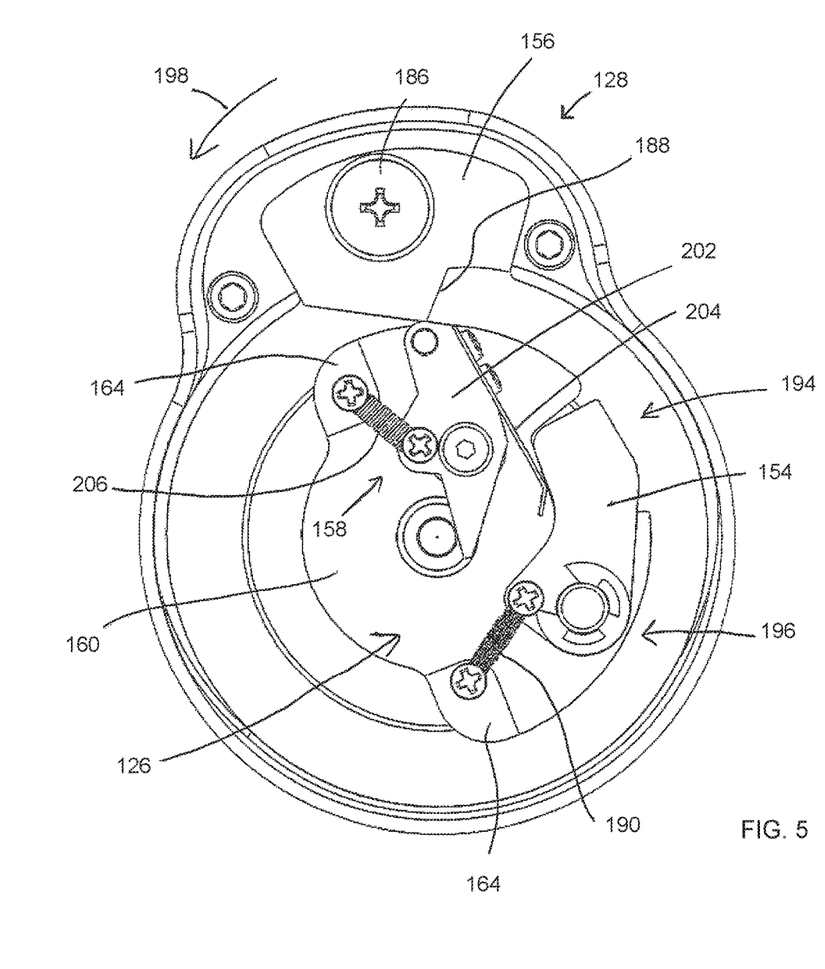
FIG. 5 shows an end plan view of a mechanical brake mechanism of the rotatable reel assembly of FIG. 2 in the unlocked (rotatable) position.
Figure 6:
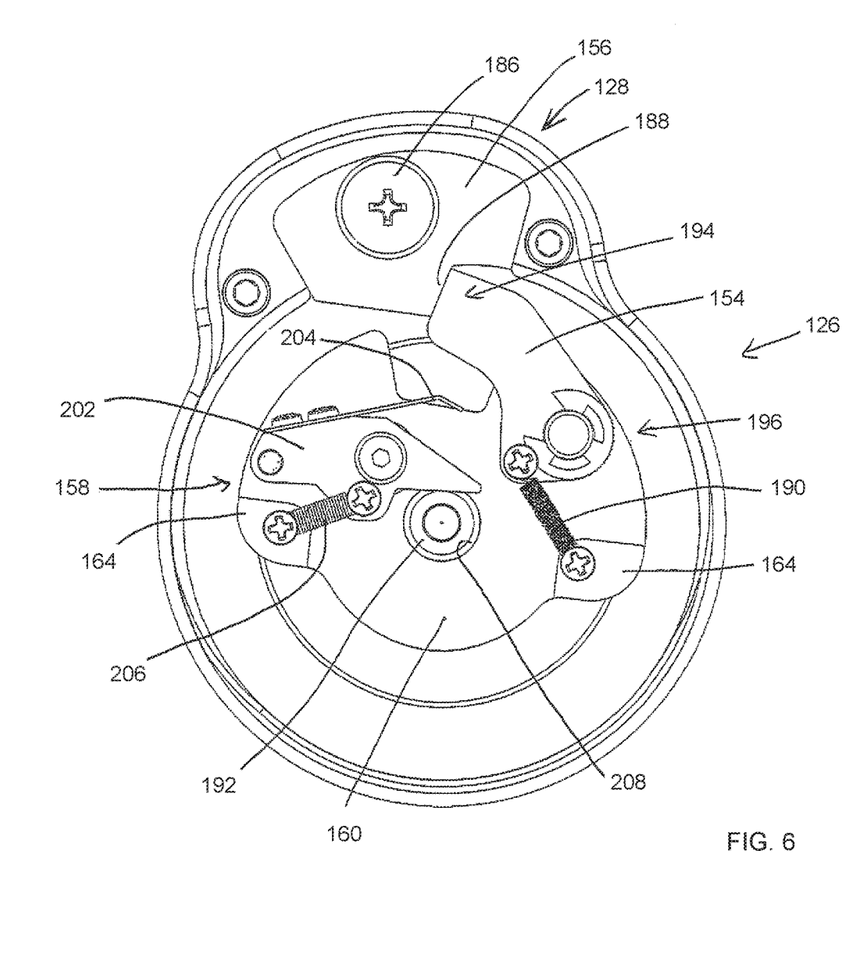
FIG. 6 shows an end plan view of the mechanical brake mechanism of FIG. 5 in the locked position.
Figure 7:
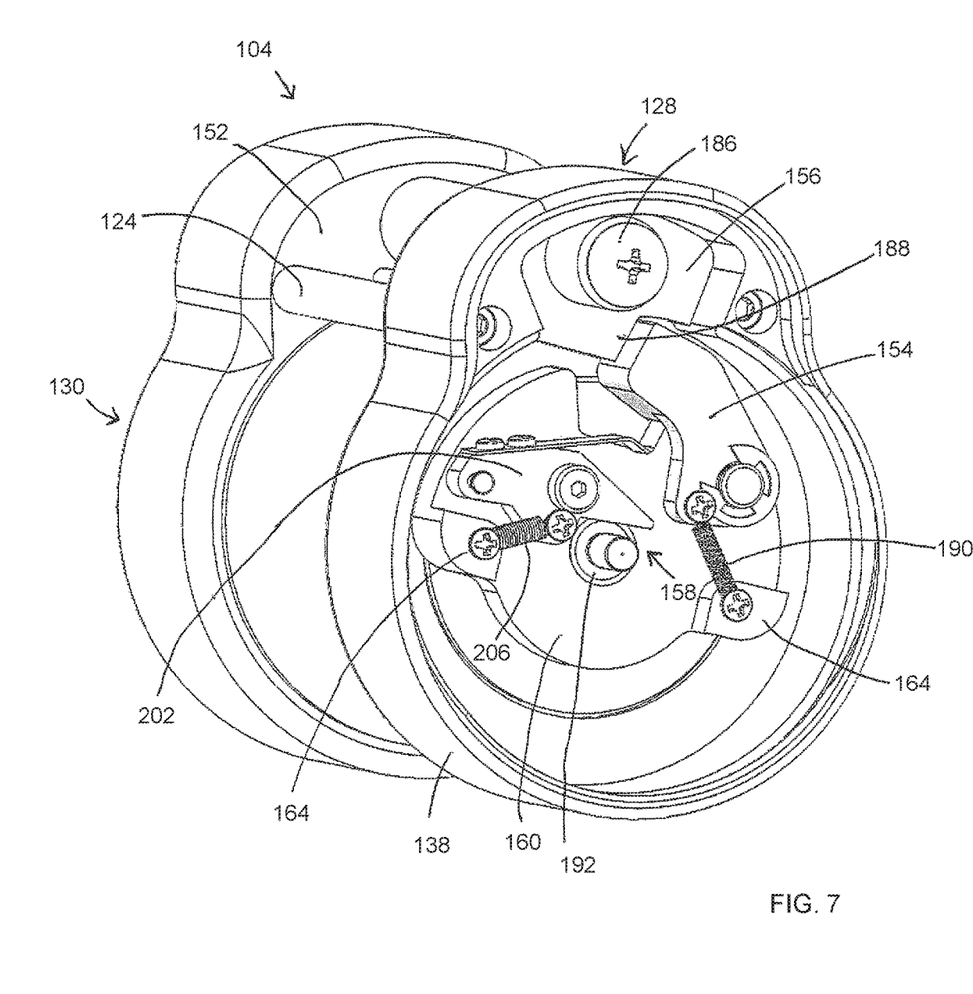
FIG. 7 shows a perspective view of the reel assembly with a cover plate removed to reveal the mechanical brake mechanism of FIG. 5

As discussed further above, the braking device 126 is configured to achieve mechanical engagement of the rotatable shaft 120 to inhibit movement of shaft 120 when the unwinding speed of the first flexible tether 106 exceeds a predetermined limit, via the action of the mechanical braking device 126. FIGS. 5-7 show the structure and operation of the mechanical braking device 126 in further detail. FIG. 5 shows a plan view of the reel assembly 102 with the cover 140 removed to reveal the braking device 126 in the unengaged state in which the rotatable shaft 120 may move in both the winding and unwinding directions. FIG. 6 shows the same plan view of the reel assembly 102 with the cover 140 removed, however, wherein the braking device 126 in the engaged state in which the rotatable shaft 120 is inhibited from movement in the unwinding direction, but may move in the winding direction. FIG. 7 shows a perspective view of the reel assembly 102 with the cover 140 removed to review the braking device 126 in the engaged position.

With reference particularly to FIGS. 5-7, the cog 156 is affixed to the frame 104 and specifically, the first housing 128, by a suitable attachment screw 186. In this embodiment, the cog 156 consists of a single tooth 188 that is machined to a size and shape to facilitate engagement by the pawl 154. In alternative embodiments, the cog 156 may have multiple additional teeth. However, the use of a single tooth cog 156 has the advantage of requiring a smaller overall housing 128 and thus a smaller frame 104, thereby reducing weight and cost.

In addition to the rotating base 160, the ratchet lock 158, the pawl 154 and the cog 156, the mechanical braking device 126 includes a pawl spring 190, a ratchet plunger 192 and a plunger spring, not shown. In general, the pawl 154 is pivotally connected to the rotating base 160, and is movable from a first (unengaged) position as shown in FIG. 5 to a second (engaged) position as shown in FIG. 6. To this end, the pawl 154 is a plate having slight elbow shape defining first end 194 that engages the cog tooth 188, and a second end 196 that is on one side pivotally connected to the rotating base 160, and on the other side is connected to the pawl spring 190. The pawl spring 190, which may suitably be a tension spring, is further connected to one axial feature 164 of the rotating base 160. The pawl spring 190 is configured to bias the pawl 154 toward the first (unengaged) position in order to allow rotation of the pawl 154 with respect to the cog 156 in the unwinding direction 198. The pawl spring 190 is selected such that when rotating base 160 and pawl 154 rotate at a velocity that exceeds the threshold associated with free-fall or a crash, the centrifugal force of the rotating pawl 154 overcomes the bias force of the spring 190 sufficiently for the pawl 154 to move outward toward the second position wherein the pawl 154 engages the cog 156.

The ratchet lock 158 is a structure that is configured to hold the pawl 154 in engagement with the cog 156 after the unwinding velocity has been reduced from that which caused the initial engagement. The ratchet lock 158 is configured to hold the pawl 154 in engagement with the cog 156 until reset. In general, the ratchet lock 158 includes a ratchet lock switch 202 and a ratchet lock flat spring 204 fixedly coupled to the ratchet lock switch 202. The ratchet lock switch 202 is a mechanical arm pivotally connected to the rotating base 160. The ratchet lock flat spring 204 in this embodiment is a leaf spring attached to a side of the switch 202 and extends outward therefrom.

The ratchet lock 158 has a first ratchet position (see FIG. 5) and a second ratchet position (see FIG. 6). In the first ratchet position, the ratchet lock 158 does not engage the pawl 154, or to the extent it engages the pawl 154, the ratchet lock 158 does not inhibit the pawl 154 from returning to the first position. By contrast, in the second ratchet position, the ratchet lock flat spring 204 inhibits the pawl 154 from returning completely to the first position, thus causing the pawl 154 to re-engage the cog 156 with any unwinding motion at any speed.

To this end, the ratchet lock 158 is biased in the first ratchet position by a ratchet lock spring 206, which may suitably be a tension spring. The ratchet lock spring 206 is connected between one end of the ratchet lock 158 and the axially extending feature 164 of the rotating base 160. The ratchet lock switch 202 is designed to have a center of gravity such that it rotates to the second ratchet position responsive to inertial force caused by sudden engagement of the pawl 154 and the cog 156. The ratchet lock flat spring 204 extends from the second end of the ratchet lock switch 202 such that when the ratchet lock 158 is in the second position, the ratchet lock flat spring occupies at least a part of the first position of the pawl 154.

The ratchet plunger 192 is a mechanical element that is configured to hold the ratchet lock 158 in the second ratchet position upon movement of the ratchet lock 158 from the first ratchet position to the second ratchet position. In this embodiment, the ratchet plunger 192 is a spring-loaded plunger disposed in a void 208 in the rotating base 160. The ratchet plunger 192 has a first plunger position, substantially within the void 208, and a second plunger position, extending axially outward from the void 208.

The void 208 is disposed in a position such that the void 208 is covered at least in part by a portion of the ratchet lock 158 when the ratchet lock 158 is in the first ratchet position, such as shown in FIG. 5, and such that the void 208 is uncovered when the ratchet lock 158 is in the second ratchet position, as shown in FIG. 6. When the void 208 is covered, the ratchet plunger 192 is trapped in the first plunger position by the ratchet lock switch 202. When the void 208 is uncovered, then the spring loaded ratchet plunger 192 extends axially outward from the void 208 (the second plunger position), where it interferes with the return of the ratchet lock 158 to the first ratchet position.

The push button assembly 146 is a device that permits manual reset of the plunger 192. Referring again to FIGS. 2 and 3, the push button assembly 146 includes a button 210 and mounting structures 212. The button 210 further includes an actuator 214 that extends through the opening 144 in the first housing 138 and over the void 208. The actuator 214 is configured to engage the ratchet plunger 192 in the second plunger position, and force the ratchet plunger 192 back into the void 208 to the first plunger position. The actuator 214 is further arranged such that while the actuator 214 is holding the ratchet plunger 192 back in the void 208, the ratchet lock 158 is nevertheless able to return to the first ratchet position and cover the void 208 at least in part.

During operation, the first flexible tether 106 is extracted from the reel assembly 102 by the user, thereby causing rotation of the rotatable shaft 120, the power spring 170, and the rotatable rotating base 160. At tether extraction velocities greater than a particular design value, the rotational motion of the shaft 120 relative to the pawl 154 (in the unwinding direction 198) produces an instantaneous centrifugal force in the pawl 154 that is great enough to overcome the holding force of the pawl spring 190. The imbalance of force permits rotation of the pawl 154 relative to the shaft 120, or in other words, permits movement of pawl 154 from the first position to the second position.

Specifically, the engagement end 194 of the pawl 154 rotates radially outward to the second position, as shown in FIG. 6. The pawl 154 in the second position engages with the cog 156, and specifically, the tooth 188. Engagement of the pawl 154 and the cog 156 stops rotation of the rotatable shaft 120 in the unwinding direction 198 and subsequently stops extraction of the first flexible tether 106.

When the pawl 154 moves into the cog 156, the engagement impact force causes the ratchet lock switch 202 (due to inertia and center of balance of the switch 202) to rotate radially outward from the first ratchet position to the second ratchet position. In the second ratchet position, the ratchet lock switch 202 no longer covers the void 208 and the plunger spring, not shown, forces the ratchet lock plunger 192 to move axially outward from the first plunger position (retracted) to the second plunger position (extended). Because the ratchet lock plunger 192 is now extended outward into the second plunger position, the ratchet lock switch 202 returns to rest on the larger diameter portion of the ratchet lock plunger 192, as shown in FIG. 6. This new resting position causes a force to be imparted into the pawl 154 through the ratchet lock flat spring 204 which overcomes the force of pawl spring 190 and forces the pawl 154 into a position in which it engages with the cog 156 during further rotation of the shaft 120 in the unwinding direction 198. This action prevents further extraction of the first flexible tether 106.

After completion of the engagement event, allowance of some slack (by the user) in the first flexible tether 106 will allow the tether 106 to retract into the reel shaft 120, but will not allow continued extraction. When tether 106 is retracted onto the reel while the pawl 154 is engaged with the cog 156, the pawl 154 engages with each passing of the tooth 188 of the cog 156, thereby decreasing the amount of tether 106 that is extracted from the reel shaft 120.

During this engaged retraction, the user or cargo item will be restrained at successively closer distances from the attachment point until the device is manually unlocked by depressing the reset button 210. Continued extraction can be activated by manually depressing the reset button 210 located in the center of the housing cover 140. Depressing the reset button 210 compresses the reset spring, not shown, but which is configured to bias the reset button 210 in the unactuated position. Depressing the reset button 210 also depresses the ratchet lock plunger 192 and the plunger spring, not shown. With the ratchet lock plunger 192 depressed, the spring 206 can pull the ratchet lock switch 202 back into the first ratchet position shown in FIG. 5. This deactivates the ratchet lock switch 202. The spring 190 then biases the pawl 154 back into the first position that allows free movement between the pawl 154 and the cog 156 in the unwinding direction 198.

Referring again to FIG. 1, it will be appreciated that one feature of the present embodiment is that the locking hook 118 on the second flexible tether 108 allows the attachment of the cargo restraint system 100 to any cargo ring or D-ring in the cabin of the aircraft. The aircraft may suitably be a cargo helicopter or other helicopter.

Nevertheless, many modifications and variations of the present invention are possible in light of the above teachings. It is to be understood, therefore, that the invention can be practiced in manners, configurations and with components other than those specifically described. Modifications, additions and substitutions applied to the present invention are within the scope and spirit of the invention as discussed in the accompanying claims.

Thus, at least some embodiments of the present invention comprise a mechanically-actuated personnel restraint system for a vehicle, and preferably a vehicle such as an aircraft. The restraint system includes a webbing reel for holding a webbing tether and for maintaining slack in the webbing in order to safely manage user travel distance in the event of an acceleration event. The system also includes a fixed-length tether and hook for attaching the system to the aircraft at existing cargo rings or D-rings.

Advantageously, the mechanically braking device 156 in this embodiment provides for engaging and disengaging the webbing reel, so that the users of the restraint system can move freely about in a benign dynamic environment, such as in the cabin of a moving aircraft such as a helicopter or airplane; or a dynamic environment such as the inside of an ambulance or fire truck, but can be adequately restrained during high acceleration vehicle events, such as crashes and dynamic maneuvers. The return mechanism 168 is provided for allowing extractions of the webbing during normal usage, and for retracting slack webbing onto the reel in order to safely maintain webbing slack between the restraint device and the user.

It will be appreciated that the above described embodiments are merely illustrative, and that those of ordinary skill in the art may readily devise their own implementations and modifications that incorporate the principles of the present invention and fall within the spirit and scope thereof.

What is claimed is:

1. A mechanically actuated cargo restraint system for a vehicle, comprising:
    a reel including a rotatable shaft in a frame; and
    a first flexible tether and a second flexible tether, the first flexible tether having a first end coupled to the rotatable shaft and a second end capable of being coupled to one of a vehicle and a cargo item, the first flexible tether windable around the rotatable shaft;
    wherein the reel further comprises a mechanical braking device, the mechanical braking device including a pawl and cog that are movable with respect to each other, the pawl coupled to the rotatable shaft for rotatable movement therewith, and wherein movement of the first flexible tether in an unwinding direction on the rotatable shaft causes movement of the pawl relative to the cog, and wherein the pawl is configured to pivotally move into engagement with the cog responsive to rotation of the rotatable shaft at a velocity in the unwinding direction exceeding a first threshold corresponding to a crash or free-fall, thereby inhibiting movement of the first flexible tether in the unwinding direction on the rotatable shaft.

2. The mechanically actuated cargo restraint system of claim 1, wherein the first flexible tether comprises webbing.

3. The mechanically actuated cargo restraint system of claim 1, wherein the frame includes:
    at least a first and a second side plate, a wound portion of the first flexible tether disposed between the first and second side plates; and
    a plurality of support rods extending between the first and second side plates.

4. The mechanically actuated cargo restraint system of claim 3, wherein the frame further includes a return mechanism housing, and further comprising a return mechanism operably coupled to provide a biasing force on the rotatable shaft in a winding direction.

5. The mechanically actuated cargo restraint system of claim 4, wherein the return mechanism includes a spring disposed in the return mechanism housing.

6. The mechanically actuated cargo restraint system of claim 5, wherein the return mechanism housing includes a first chamber and a second chamber and a wall disposed between the first chamber and the second chamber, the first chamber receiving a coiled portion of the spring, the second chamber receiving an end of the spring.

7. The mechanically actuated cargo restraint system of claim 1, wherein:
    the first mechanical braking device includes a base affixed to rotate with the rotatable shaft, the pawl pivotally connected to the base, the pawl biased in a first position that allows rotation of the pawl with respect to the cog, the velocity in the unwinding direction causing the pawl to move to a second position wherein the pawl engages the cog.

8. The mechanically actuated cargo restraint system of claim 7, further comprising a ratchet lock pivotally connected to the base, the ratchet lock having a first ratchet position and a second ratchet position, wherein the ratchet lock is biased in the first ratchet position, and wherein the ratchet lock is configured to rotate to the second ratchet position responsive to inertial force caused by engagement of the pawl and the cog, the ratchet lock in the second ratchet position configured to retain the pawl and cog in engagement.

9. The mechanically actuated cargo restraint system of claim 8, further comprising a spring coupled to the ratchet lock and the base, the spring biasing the ratchet lock toward the first ratchet position.

10. The mechanically actuated cargo restraint system of claim 8, further comprising a ratchet plunger configured to hold the ratchet lock in the second ratchet position upon movement of the ratchet lock from the first ratchet position to the second ratchet position.

11. The mechanically actuated cargo restraint system of claim 10, wherein the ratchet plunger has a first plunger position and a second plunger position, the ratchet plunger exposed to a bias force toward the second ratchet position, the ratchet plunger held in the first plunger position by the ratchet lock in the first ratchet position, the ratchet plunger held in the second plunger position by the bias force.

12. The mechanically actuated cargo restraint system of claim 11, wherein the frame further includes a return mechanism housing, and further comprising a return mechanism operably coupled to provide a biasing force on the rotatable shaft in a winding direction.

13. The mechanically actuated cargo restraint system of claim 12, wherein the return mechanism includes a spring disposed in the return mechanism housing.

14. The mechanically actuated cargo restraint system of claim 13, wherein the return mechanism housing includes a first chamber and a second chamber and a wall disposed between the first chamber and the second chamber, the first chamber receiving a coiled portion of the spring, the second chamber receiving an end of the spring.

15. A mechanically actuated cargo restraint system for a vehicle, comprising:
    a reel including a rotatable shaft in a frame; and
    a first flexible tether and a second flexible tether, the first flexible tether having a first end coupled to the rotatable shaft and a second end capable of being coupled to one of a vehicle and a cargo item, the first flexible tether windable around the rotatable shaft;
    wherein the frame includes at least a first and a second side plate, a wound portion of the first flexible tether disposed between the first and second side plates,
    wherein a plurality of support rods extends between the first and second side plates,
    wherein the reel further comprises a mechanical braking device, the mechanical braking device including a pawl and cog that are movable with respect to each other, the pawl coupled to the rotatable shaft for rotatable movement therewith,
    wherein movement of the first flexible tether in an unwinding direction on the rotatable shaft causes movement of the pawl relative to the cog, and
    wherein the pawl is configured to engage the cog responsive to rotation of the rotatable shaft at a velocity in the unwinding direction exceeding a first threshold corresponding to a crash or free-fall, thereby inhibiting movement of the first flexible tether in the unwinding direction on the rotatable shaft.

16. The mechanically actuated cargo restraint system of claim 15, wherein the first flexible tether comprises webbing.

17. The mechanically actuated cargo restraint system of claim 15, wherein the frame further includes a return mechanism housing, and further comprising a return mechanism operably coupled to provide a biasing force on the rotatable shaft in a winding direction.

18. The mechanically actuated cargo restraint system of claim 17, wherein the return mechanism includes a spring disposed in the return mechanism housing.

19. The mechanically actuated cargo restraint system of claim 18, wherein the return mechanism housing includes a first chamber and a second chamber and a wall disposed between the first chamber and the second chamber, the first chamber receiving a coiled portion of the spring, the second chamber receiving an end of the spring.

20. The mechanically actuated cargo restraint system of claim 15, wherein:
    the mechanical braking device includes a base affixed to rotate with the rotatable shaft, the pawl pivotally connected to the base, the pawl biased in a first position that allows rotation of the pawl with respect to the cog, the velocity in the unwinding direction causing the pawl to move to a second position wherein the pawl engages the cog.

* * * * *